Oct. 8, 1935.  M. L. DRAKE  2,016,597
TOOTH CLEANING AND GUM STIMULATING DEVICE
Filed Aug. 28, 1933
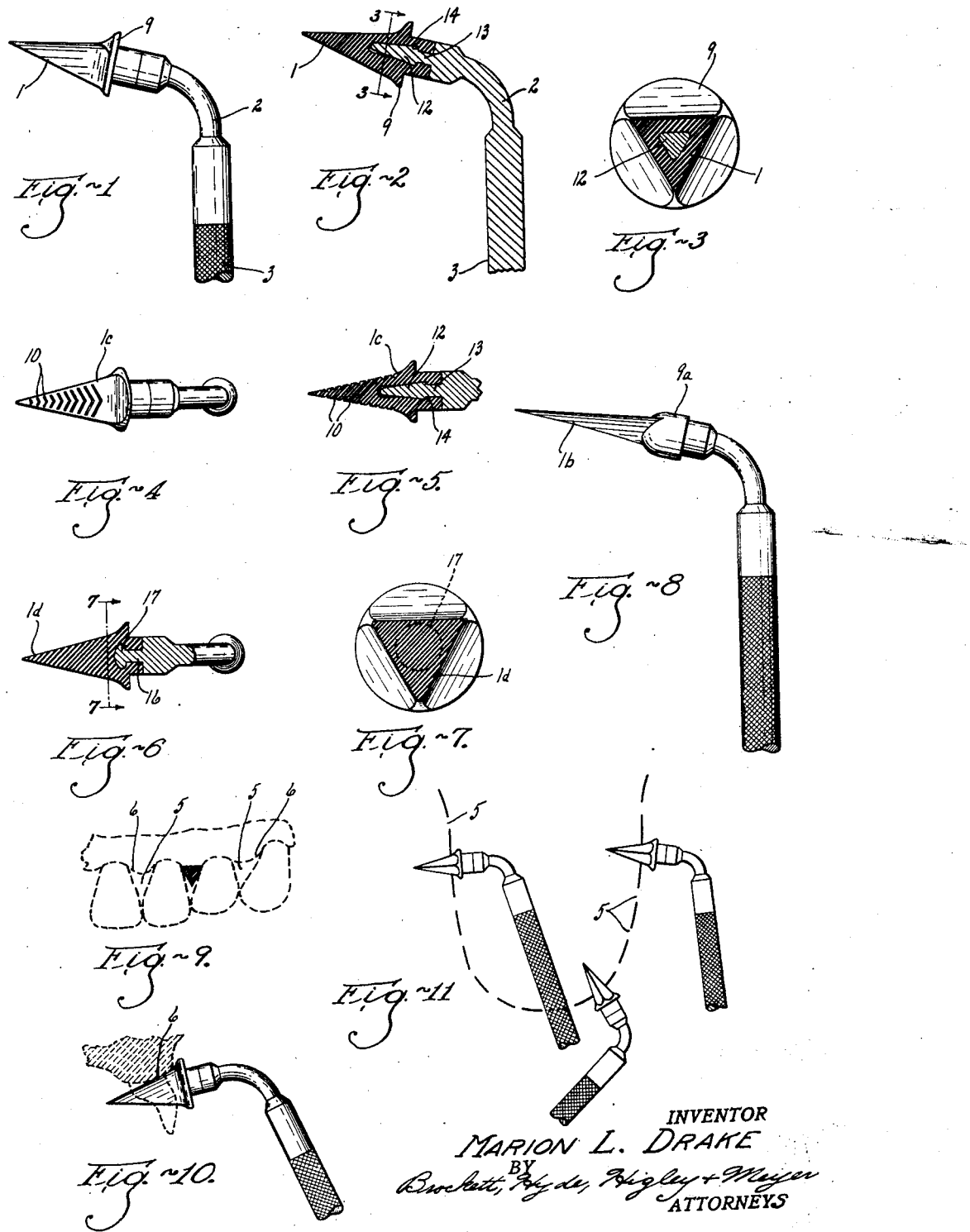
INVENTOR
MARION L. DRAKE
BY
ATTORNEYS Patented Oct. 8, 1935

2,016,597

UNITED STATES PATENT OFFICE 2,016,597

TOOTH CLEANING AND GUM STIMULATING DEVICE

Marion L. Drake, Cleveland Heights, Ohio

Application August 28, 1933, Serial No. 687,039

3 Claims. (Cl. 128—62)

This invention relates to a tooth cleaning and gum stimulating device having for its purpose the effective reduction, interdentally, of the "detritic, infective factor" as related to pyorrhea "simplex" and the effective prevention or reduction of interdental congestion and œdema. More particularly, the present invention relates to a device for cleaning the interdental spaces, namely, those generally triangular spaces between adjacent teeth, and for stimulating by massage those portions of the gums adjacent said spaces, namely, the interdental gingivae.

For the accomplishment of such purposes, the present device includes a tooth cleaning and gum stimulating member of tapered form, of yielding character and of generally triangular shape in cross section, and a suitable metal handle for manipulating said member, said handle having a hand gripping portion extending at substantially a seventy degree angle to said member, whereby access of said member to said interdental spaces and the adjacent gum tissues, both from the buccal and the lingual, for tooth cleaning and gum stimulating purposes, may be easily, conveniently and properly effected.

The tapered form of said tooth cleaning and gum stimulating member enables it to enter any size interdental space; the triangular cross-sectional shape of said member enables it to properly fit the correspondingly shaped interdental spaces, with proper engagement of the flat sides of said member with the adjacent teeth and gum surfaces; and the yielding character of said member enables it to apply the proper stimulating pressure to the interdental gingiva without liability of injury thereof.

If desired and as here shown, the tooth cleaning and gum stimulating member of the present device may be provided with suitable means, such as transversely disposed grooves or the like, for receiving medicaments and/or tooth polishing agents, said grooves or other such means, when containing medicaments, being especially useful in the treatment of such diseases as sub-acute Vincent's infection.

Likewise, if desired and as shown, the rear end of said tooth cleaning and gum stimulating member may be of outwardly flaring, annular form, to not only limit insertion of said member into the interdental spaces but also, to assist in applying stimulating pressure to the interdental gingiva and to apply stimulating pressure to the labial and lingual gum tissue adjacent said interdental gingiva.

Although assembly of the tooth cleaning and gum stimulating member and its manipulating handle may be effected in any suitable manner and by any suitable means, said handle, in the embodiments of the invention here shown, is provided at its upper end with a forwardly projecting, integral extension, on which the tooth cleaning and gum stimulating member is mounted, said extension not only serving as a rigid support for said member but also serving as a re-enforcement therefor to give it the desired rigidity and durability. If desired, the tooth cleaning and gum stimulating member may be mounted on said handle extension for slight rotary movement thereon, to enable it to be self-adjusting relative to the interdental spaces which it is adapted to enter, thereby insuring that a flat side of said member, rather than a longitudinal edge thereof, will engage the interdental gingiva during use of the present device.

With the foregoing features of the invention in view and others thereof which will appear as the description of the invention proceeds, the invention resides in the combination and arrangement of parts and in the details of construction hereinafter described and claimed, it being understood, of course, that changes in the invention as herein disclosed can be made within the scope of what is claimed, without departing from the spirit of the invention.

The invention will be readily understood from the following description of several embodiments thereof, reference being had to the accompanying drawing in which Fig. 1 is a side elevation of a tooth cleaning and gum stimulating device constructed in accordance with one embodiment of the present invention, the lower portion of the handle of said device being broken away; Fig. 2 is a longitudinal sectional view of said device; Fig. 3 is a detail cross-sectional view thereof on the line 3—3, Fig. 2; Fig. 4 is a top plan view of a slightly modified form of device, the tooth cleaning and gum stimulating member thereof being provided with grooves for receiving medicaments and/or tooth polishing agents; Fig. 5 is a detail horizontal sectional view of the device shown in Fig. 4; Fig. 6 is a view similar to Fig. 5 but showing another embodiment of the present invention; Fig. 7 is a detail vertical sectional view of the device shown in Fig. 6, the view being on the line 7—7, Fig. 6; Fig. 8 is a view similar to Fig. 1 but showing yet another form of the present invention; and Figs. 9, 10 and 11 are diagrammatic views showing the manner in which the present device is used for tooth cleaning and gum stimulating purposes.

Referring first to Figs. 1, 2 and 3, the device therein illustrated includes a tooth cleaning and gum stimulating member 1 and a suitable handle 2 therefor, said handle being of metal or other suitable material and having a knurled hand gripping portion 3 extending at substantially a seventy degree angle to said tooth cleaning and gum stimulating member, whereby access to said member to the interdental spaces and the interdental gingivae (some of which spaces and gingivae are diagrammatically shown at 5 and 6, respectively, Figs. 9 and 11), for tooth cleaning and gum stimulating purposes, may be easily, conveniently and properly effected.

As clearly shown in Figs. 1 and 2, the tooth cleaning and gum stimulating member 1 is of tapered form, terminating at its forward end in a relatively sharp point, whereby said member is enabled to enter any size interdental space. In cross section, said member is of generally triangular shape, as best shown in Fig. 3, to enable it to properly fit the correspondingly shaped interdental spaces (see Fig. 9), with proper engagement of its three flat sides with the adjacent teeth and gum surfaces. As to the material of which said tooth cleaning and gum stimulating member is made, rubber or a rubber compound of a fair degree of firmness is probably the most satisfactory, inasmuch as said material enables massaging pressure of several pounds to be applied to the interdental gingivae without liability of injury thereof.

Preferably and as shown in Figs. 1, 2 and 3, the rear end 9 of the tooth cleaning and gum stimulating member 1 is of outwardly flaring, annular form, to not only limit insertion of said member into the interdental spaces but also, to assist in applying stimulating pressure to the interdental gingiva and to apply stimulating pressure to the labial and lingual gum tissue adjacent said interdental gingivae, all as best shown in Fig. 10.

In the embodiment of the invention shown in Fig. 8, the tooth cleaning and gum stimulating member 1b is longer and more slender than the tooth cleaning and gum stimulating members of the other illustrated embodiments of the invention. Furthermore, the rear end 9a of the tooth cleaning and gum stimulating member 1b of Fig. 8 is of cylindrical shape, rather than of outwardly flaring shape. For small interdental spaces and exceptionally soft interdental gingiva, the more slender and more flexible tooth cleaning and gum stimulating member of Fig. 8 may be preferred, as will be readily understood.

If desired, the tooth cleaning and gum stimulating member of the present device may be provided with suitable means for receiving medicaments and/or tooth polishing agents, and in the embodiment of the invention shown in Figs. 4 and 5, the tooth cleaning and gum stimulating member 1c is provided, on each of its three flat sides, with a series of longitudinally spaced, transversely disposed grooves 10 for receiving medicaments and/or tooth polishing agents, said grooves being of V shape with the apexes thereof disposed rearwardly and with the ends thereof terminating short of the longitudinal edges of said member, as shown.

As a result, medicaments and/or tooth polishing agents are readily retained in said grooves and are conveniently carried thereby to the desired surfaces to be treated or polished. In the treatment of sub-acute Vincent's infection and the like, the use of such grooves or the like, containing medicaments is of great assistance.

Although assembly of the tooth cleaning and gum stimulating member and its manipulating handle may be effected in any suitable manner and by any suitable means, said handle, in the several embodiments of the invention here shown, is provided at its upper end with a forwardly projecting integral extension, on which the tooth cleaning and gum stimulating member is mounted, said extension not only serving as a rigid support for said member but also serving as a re-enforcement therefor to give it the desired rigidity and durability.

In the two embodiments of the invention shown in Figs. 1 to 5 inclusive, the handle extension upon which the tooth cleaning and gum stimulating member is mounted (member 1 in Figs. 1, 2 and 3 and member 1a in Figs. 4 and 5), has a front end portion 12 of generally triangular shape in cross section (see Fig. 3) and a rear end portion 13 of cylindrical shape and of reduced size, said reduction in size forming between said portions an annular shoulder 14 which effectively serves as a means for securely retaining the tooth cleaning and gum stimulating member on said extension. In the embodiment of the invention shown in Figs. 6 and 7, the handle extension 16, upon which is mounted the tooth cleaning and gum stimulating member 1d (said member having a construction identical to that of member 1 of Figs. 1, 2 and 3), is provided at its front end with an enlarged, knob-like head 17 which serves as the means for retaining said tooth cleaning and gum stimulating member on said extension. In this embodiment of the invention, the tooth cleaning and gum stimulating member 1d is rotatably adjustable on the handle extension on which it is mounted, so that said member is free to turn on said extension to adjust itself to any interdental space into which it is inserted, whereby a flat side of said member, rather than a longitudinal edge thereof, will always be presented to the interdental gingiva.

In the use of the present device, the tooth cleaning and gum stimulating member is inserted into an interdental space, either from the buccal or from the lingual, with one of the flat sides of said member (as distinguished from a longitudinal edge thereof) lying against the adjacent gum or interdental gingiva, as diagrammatically shown in Figs. 9, 10 and 11. This is best accomplished by keeping the handle of the device generally vertically disposed for the upper teeth, as in Fig. 10, and at an angle of about thirty degrees to the horizontal for the lower teeth, as in Fig. 11. With the tooth cleaning and gum stimulating member firmly inserted in an interdental space, and with a flat side of said member yieldingly but firmly engaging the interdental gingiva, as shown, the handle of the device is moved in one-eighth to one-quarter inch circles, such rotary movement resulting in alternate applications and release of massaging pressure on the interdental gingiva, and also on the labial and lingual gum tissue adjacent said interdental gingiva, if the tooth cleaning and gum stimulating member has an outwardly flaring rear end, as shown in most of the illustrated embodiments of the invention, with consequent stimulation of blood and lymph circulation and with ejection from the gingival crevice of muco-purulent and detritic material. In this way, the present device, used as an adjunct to a tooth brush, brings about a state of interdental health and cleanliness which can be effected in no other way and by the use of no other means.

Further features and advantages of the present device will be readily apparent to periodontists and others skilled in the art to which it relates.

What I claim is:

1. A tooth-cleaning and gum-stimulating device, comprising a relatively short or stubby tooth-cleaning and gum-stimulating part and a relatively rigid handle therefor, said handle having a hand-gripping portion extending angularly relative to said tooth-cleaning and gum-stimulating part from a point adjacent thereto, whereby said part can be positioned inside the dental arch for convenient outward insertion into the inter-dental spaces and positioned outside said arch for convenient inward insertion into said spaces, said tooth-cleaning and gum-stimulating part being of yielding character so that sufficient stimulating pressure can be applied to the gums adjacent said inter-dental spaces without liability of injury to said gums and being of generally triangular shape in cross-section to correspond to the shape of such inter-dental spaces and being of fairly steep tapered form to enable said part to fit inter-dental spaces of varying size.

2. A device as set forth in claim 1, characterized in that said handle has an extension on which said tooth-cleaning and gum-stimulating part is mounted, said handle extension having a cross-sectional shape and a taper corresponding to those of said part.

3. A tooth-cleaning and gum-stimulating device, comprising a short or stubby tooth-cleaning and gum-stimulating part and a rigid handle therefor, said handle having a hand-gripping portion extending angularly relative to said tooth-cleaning and gum-stimulating part from a point adjacent thereto, whereby said part can be positioned inside the dental arch for convenient outward insertion into the inter-dental spaces and positioned outside said arch for convenient inward insertion into said spaces, said tooth-cleaning and gum-stimulating part being of yielding character so that sufficient stimulating pressure can be applied to the gums adjacent said inter-dental spaces without liability of injury to said gums and being of fairly steep tapered form to enable said part to fit inter-dental spaces of varying size.

MARION L. DRAKE.